United States Patent [19]

Shibayama et al.

[11] Patent Number: 4,587,887
[45] Date of Patent: May 13, 1986

[54] SHIFT VALVE FOR AUTOMATIC TRANSMISSION

[75] Inventors: Takashi Shibayama, Chigasaki; Kazuhiko Sugano, Yokohama, both of Japan

[73] Assignee: Nissan Motor Co., Ltd., Yokohama, Japan

[21] Appl. No.: 655,677

[22] Filed: Sep. 28, 1984

[30] Foreign Application Priority Data

Oct. 7, 1983 [JP] Japan .................... 58-187088

[51] Int. Cl.$^4$ ........................... F15B 13/042
[52] U.S. Cl. ........................ 91/469; 74/868; 137/625.66
[58] Field of Search ............... 74/865, 867, 868; 137/625.66; 91/469

[56] References Cited

U.S. PATENT DOCUMENTS

| 2,604,197 | 7/1952 | Livermore | 74/865 X |
| 2,733,732 | 2/1956 | Baker | 74/867 X |
| 3,096,666 | 7/1963 | Christenson et al. | 74/867 X |
| 3,908,486 | 9/1975 | Mitamura et al. | |
| 4,008,630 | 2/1977 | Murakami et al. | 74/865 |
| 4,229,998 | 10/1980 | Mizuno et al. | 74/865 |
| 4,274,308 | 6/1981 | Iwanaga et al. | |
| 4,532,829 | 8/1985 | Sugano | 74/867 X |

FOREIGN PATENT DOCUMENTS 17696 2/1980 Japan .
2061422 5/1981 United Kingdom .

Primary Examiner—Gerald A. Michalsky
Attorney, Agent, or Firm—Schwartz, Jeffery, Schwaab, Mack, Blumenthal & Evans

[57] ABSTRACT

A shift valve for an automatic transmission wherein governor pressure acts on a spool in such a direction as to compress a first spring, and throttle representative pressure acts on a plug in such a direction as to compress the first spring. The shift control valve further comprises a second spring arranged to act on the spool in the same direction as the direction in which the governor pressure acts on the spool.

6 Claims, 4 Drawing Figures

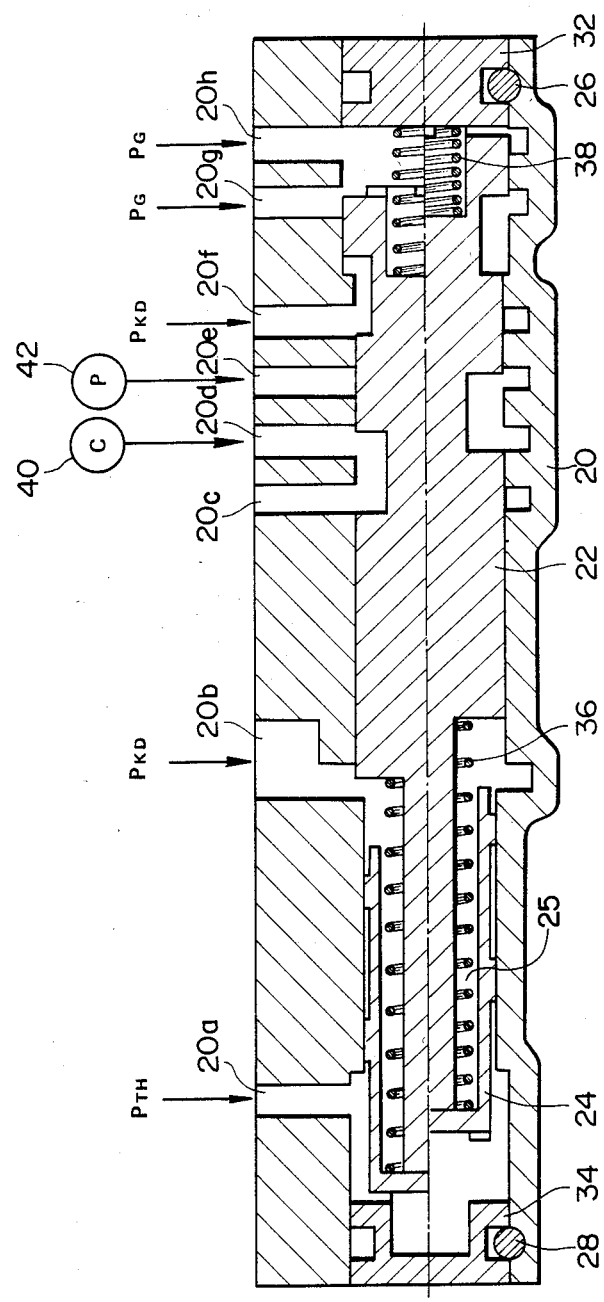

SHIFT VALVE FOR AUTOMATIC TRANSMISSION

BACKGROUND OF THE INVENTION

The present invention relates to a shift valve for an automatic transmission.

A representative example of conventional shift valves is illustrated in FIG. 1. This conventional shift valve for an automatic transmission comprises a spool 10 for switching an oil delivery conduit, a plug 12, and a spring 14 arranged between them. Governor pressure $P_G$ acts on the spool 10 in one direction and throttle pressure $P_{TH}$ acts on the plug 12 in another direction which is opposite to the one direction. With this shift valve for automatic transmission, a change-over characteristic as shown in FIG. 2, i.e., a shift schedule line, is obtained. This shift schedule line consists of a line portion A representing that governor pressure $P_G$ varies with throttle pressure $P_{TH}$ and another line portion B representing that governor pressure $P_G$ is unchanged irrespective of variation in throttle pressure $P_{TH}$. If the force of the spring 14 is changed, the governor pressure value $P_G$ for the line portion B can be varied, but the line portion A remains unchanged. (In order to change the line portion A, a pressure acting area of the spool 10 or the plug 12 must be varied.)

Various kinds of shift schedule lines are required depending upon different types of engines and different types of vehicles. If, in order to provide a different shift schedule line, the valve bore, spool and plug are redesigned in configuration, numerous kinds of valve bodies, spools and plugs must be manufactured, complicating manufacturing of and management of component parts, and pushing up cost as well. Thus, it is quite advantageous if a different shift schedule line is provided only by replacing the spring. However, in the case of the above mentioned conventional shift valve for automatic transmission, replacing the spring will result in a change in only a portion of the shift schedule line. That is, with the conventional shift valve, it is not possible to vary the line portion A by changing the characteristic of the spring.

SUMMARY OF THE INVENTION

An object of the present invention is to provide a shift valve for an automatic transmission which can provide a desired different shift schedule line by merely replacing spring means thereof.

A shift valve according to the present invention comprises a spool and a plug which are fit in a coaxial valve bore, and a first spring, where governor pressure acts on the spool in such a direction as to compress the first spring and throttle representative pressure acts on the plug in such a direction as to compress the first spring, wherein a second spring acts on the spool in the same direction as the direction in which the governor pressure acts on the spool, and a force of the second spring is smaller than a force of the first spring.

BRIEF DESCRIPTION OF THE DRAWINGS

FIG. 3 is a sectional view showing a shift valve for an automatic transmission according to the present invention.

DETAILED DESCRIPTION OF THE INVENTION

Figure 4:
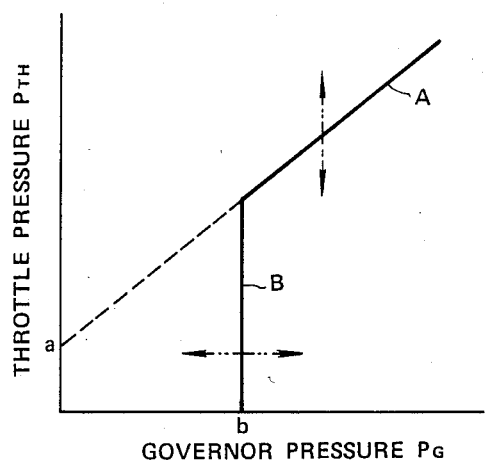
FIG. 4 shows a shift schedule line provided by the shift valve according to the present invention.

Referring to FIGS. 3 and 4, the present invention is hereinafter described.

FIG. 3 shows a shift valve for an automatic transmission according to the present invention. This shift valve comprises a spool 22 and a plug 24 which are slidably fit in a valve bore formed in a valve body 20. At the both ends of the valve bore, retainers 32 and 34 are mounted by pins 26 and 28, respectively. Between the spool 22 and the plug 24 is arranged a first spring 36. The spring 36 is preferably positioned in a recessed portion of the plug 24. The recess can take the form of a longitudinal bore 25. Between the retainer 32 and the spool 22 is arranged a second spring 38. A force of the second spring 38 is smaller than a force of the first spring 36. The valve body 20 is formed with oil grooves 20a to 20h. The oil groove 20a is connected to a throttle pressure circuit. The oil grooves 20b and 20f are connected to a kickdown pressure circuit. The oil groove 20c is a drain port. THe oil groove 20d is connected to a circuit that communicates with a clutch 40. The port 20e is connected to a circuit that communicates with a source of oil pressure 42. The ports 20g and 20h are connected to a governor pressure circuit which receives governor pressure representative of vehicle speed.

Figure 1:
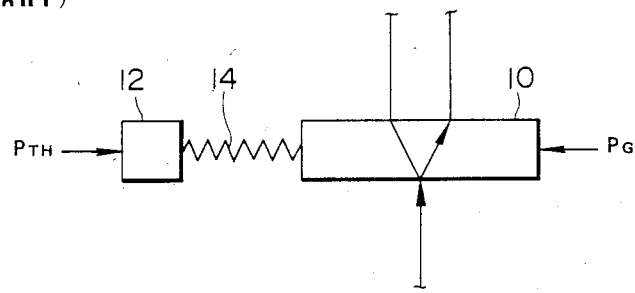
FIG. 1 is a diagrammatic view of the previously discussed conventional shift valve.
Figure 2:
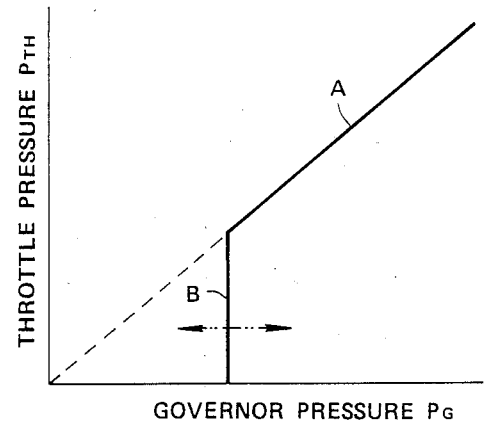
FIG. 2 shows a shift schedule line provided by the conventional shift valve shown in FIG. 1.

When not in a kickdown state, the ports 20b and 20f are drained. In this state, a leftward force due to governor pressure $P_G$ supplied from the oil groove 20h and another leftward force due to the second spring 38 act on the spool 22. Also acting on the spool 22 are a rightward force due to the first spring 36 or after the plug 24 has come into contact with the spool 22, a force with which throttle pressure $P_{TH}$ supplied from the oil groove 20a acts on the plug 24 is added to the rightward force due to the first spring 36. The spool 22 is movable so as to balance the total of the above mentioned leftward forces with the total of the rightward forces and is shiftable between a down position as indicated by a bottom half and an up position as indicated by an upper half. When the spool 22 assumes the down position, the oil groove 20d is allowed to communicate with the oil groove 20e, thus admitting oil pressure from the source of oil pressure 42 to the clutch 40. When, on the other hand, the spool 22 assumes the up position, the oil groove 20d is allowed to communicate with the oil groove 20c, thus draining the oil pressure of the clutch 40. In the above mentioned manner, the clutch 40 is engaged or released, thus effecting shifting between gears. A shift schedule line where the clutch 40 is engaged or released is illustrated in FIG. 4. In the case where the plug 24 is out of contact with the spool 22 when the throttle pressure $P_{TH}$ is low, acting on the spool 22 to urge same to the right is the force due to the spring 36 only so that governor pressure $P_G$ at which the spool 22 is shifted is a constant value b and thus a line portion B of the shift schedule line as shown in FIG. 4 is provided. When the plug 24 has come into contact with the spool 22 when the throttle pressure $P_{TH}$ is increased, the rightward force due to the throttle pressure $P_{TH}$ is added to the force due to the spring 36, so that the value in governor pressure $P_G$ at which the spool 22 is shifted varies depending upon the throttle pressure $P_{TH}$ and thus a line portion A of the shift schedule line as shown in FIG. 4 is provided. A value of an intersecting point a where an extended line of the line portion A intersects with an ordinate is determined by the force of the spring 38. Therefore, varying the force of the second spring 38 will result in shifting of the line portion A in a vertical direction as viewed in FIG. 4. That is, if the force of the second spring 38 is set large, the line portion A shown in FIG. 4 moves upward, whereas if the force of the second spring 38 is set small, the line portion A moves downward. If the force of the second spring 38 is set zero (that is, the second spring 38 is taken away), the value a becomes zero so that the line portion A intersects with the origin of the coordinate axes, resulting in providing the same shift schedule line as shown in FIG. 2. A value b of an intersecting point where the line portion B intersects with the abcissa can be varied by varying the force of the first spring 36 in the similar manner employed by the conventional shift valve. As previously mentioned, the force of the second spring 38 is set smaller than the force of the first spring 36. If the force of the second spring 38 is set larger, the spool 22 always assumes the up position when the throttle pressure $P_{TH}$ approaches zero, thus providing inappropriate shift schedule line. As a result, with the shift valve for the automatic transmission according to the present invention, both of the line portion A and line portion B of the shift schedule line as shown in FIG. 4 can be varied by varying the spring force of the second spring 38 and the force of the first spring 36, thus providing a desired shape of shift schedule line. It will now be understood that without relying on the design change in configuration of the spool 22 and the plug 24, various kinds of shift schedule lines can be provided.

What is claimed:

1. In an automatic transmission:
   a fluid operated friction device;
   a source of servo actuating pressure;
   a source of governor pressure;
   a source of throttle representative pressure;
   a shift valve comprising
   a valve body formed with a valve bore, an inlet port communicating with said source of servo actuating pressure, an outlet port communicating with said fluid operated friction device, and a drain port;
   a spool slidably fit in said valve bore, said spool being movable between a first position where said outlet port is allowed to communicate with said inlet port only, and a second position where said outlet port is allowed to communicate with said drain port only;
   a plug slidably fit in said valve bore;
   a first spring arranged between said spool and said plug;
   said valve body being formed also with a first signal pressure port communicating with said source of governor pressure, and a second signal pressure port communicating with said source of throttle representative pressure;
   said spool being formed with a pressure acting area which is always subject to pressure at said first signal pressure port and urged in such a first direction as to compress said first spring in response to the pressure which said pressure acting area is subject to;
   said end plug being formed with a pressure acting area which is always subject to pressure at said second signal pressure port and urged in such a second direction as to compress said first spring in response to the pressure which said pressure acting area thereof is subject to; and
   a second spring so arranged as to act on said spool to urge said spool in said first direction said second spring being set weaker than said first spring.

2. An automatic transmission as claimed in claim 1, wherein said throttle representative pressure is one of a throttle pressure and an oil pressure variable depending on the throttle pressure.

3. A shift valve for an automatic transmission, comprising:
   a valve body having servo actuating pressure inlet and outlet ports, and a drain port;
   a spool slidably positioned within said valve body at one end thereof;
   a plug slidably positioned within said valve body at the other end thereof, said plug including a recessed portion facing said spool;
   a first spring positioned in said recessed portion, one end of said first spring abutting said plug and the other end of said spring abutting said spool;
   a second spring positioned between said spool and said one end of said valve body, the force of said second spring being smaller than the force of said first spring;
   means for applying a throttle representative pressure to said plug to urge said plug toward said spool;
   means for applying a governor pressure to said spool to urge said spool toward said plug;
   said spool being reversably shiftable between a first position wherein said servo actuating pressure inlet and outlet ports are in fluid communication, and a second position wherein said outlet port and said drain port are in fluid communication;
   wherein said recessed portion is spaced from said spool at low throttle pressures, and abuts said spool at high throttle pressures, the transition throttle pressure between said high and low throttle pressures being a function of the force of said first and second springs; and
   wherein the governor pressure required to shift said spool is constant at said low throttle pressures, and is further a function of throttle pressure at said high throttle pressures.

4. A shift valve as claimed in claim 3, wherein the governor pressure required for shifting of said spool at said transition throttle pressure is a function of the force of said first spring, and wherein said transition throttle pressure for a specified governor pressure is a function of the force of said second spring.

5. A shift valve as claimed in claim 3, wherein said means for applying a throttle representative pressure and for applying a governor pressure include oil grooves.

6. A shift valve as claimed in claim 3, wherein said recess portion of said plug comprises a longitudinal bore.

* * * * *